Jan. 18, 1955   H. A. KUEHNE   2,700,132
ELECTROMAGNETIC THICKNESS INDICATOR OR DETECTOR
Filed March 14, 1951
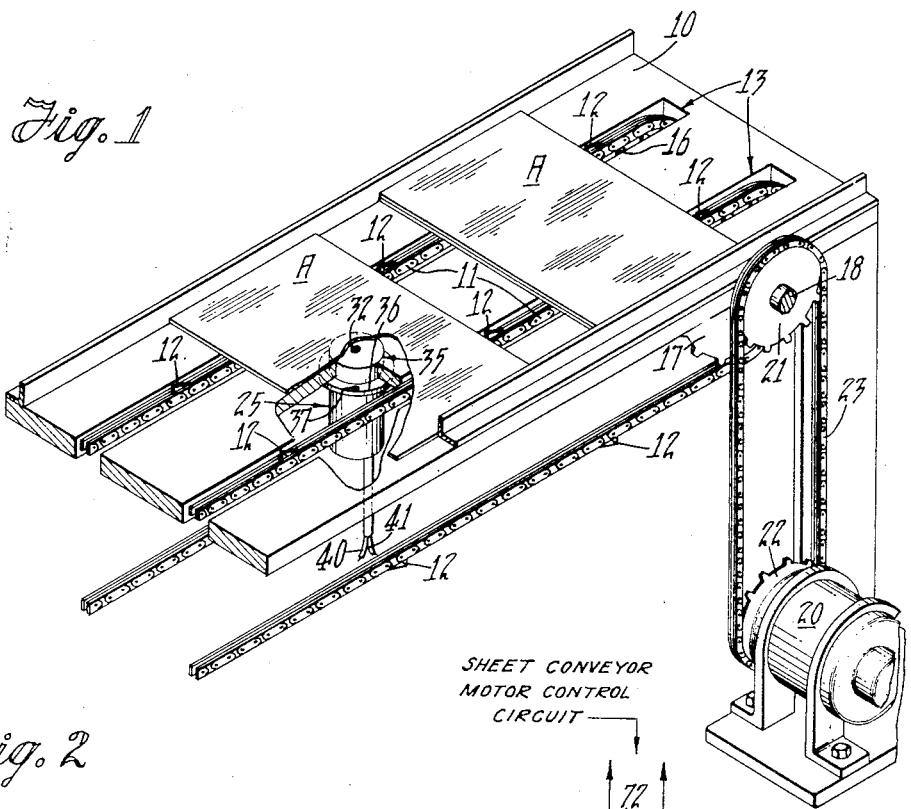
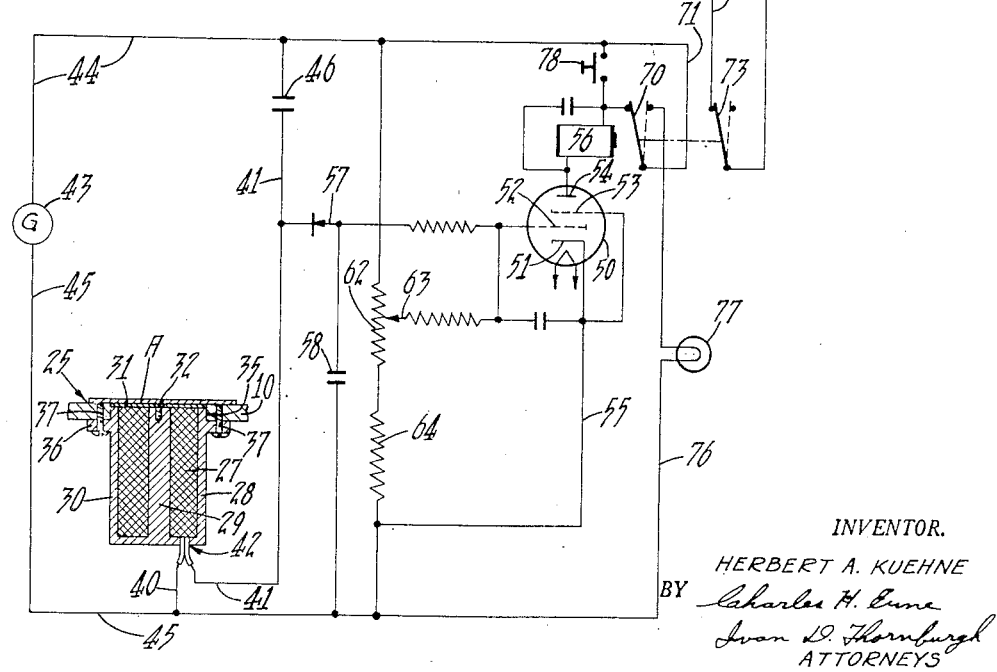
INVENTOR.
HERBERT A. KUEHNE
BY
ATTORNEYS

United States Patent Office 2,700,132
Patented Jan. 18, 1955

2,700,132

ELECTROMAGNETIC THICKNESS INDICATOR OR DETECTOR

Herbert A. Kuehne, Maywood, Ill., assignor to American Can Company, New York, N. Y., a corporation of New Jersey Application March 14, 1951, Serial No. 215,605

1 Claim. (Cl. 324—34)

The present invention relates to devices for preventing the feeding of more than one thickness of magnetic sheet material into printing, fabricating or other sheet or blank treating machines, and has particular reference to an electronic double detector having an electromagnetic detecting head which is disposed in the path of travel of the sheets or blanks.

In industries such as the can manufacturing industry which fabricate metal articles out of sheet metal, modern equipment is used wherein the sheets are fed automatically at high speed. In order to avoid damage to the equipment and/or the production of imperfect articles, double sheet detectors are commonly used to prevent the feeding of sheets which stick together or which partially overlap each other. These detectors, as a rule, rely upon feeler members which ride upon the surface of the sheets and mechanically determine its thickness. As a result, minor imperfections such as bumps or burred or drip edges often cause the unwarranted rejection of acceptable sheets. These mechanical detectors usually are cumbersome, difficult to mount and expensive and prevent unobstructed access to the sheets in the machine.

The present invention overcomes these problems by providing a double sheet or blank detector wherein the magnetic permeability of the sheets is utilized to produce an accurate and reliable detecting operation. This is accomplished by bringing the sheets into contact with the face of an electromagnetic detecting head which includes an electromagnet having an open magnetic circuit. The electromagnet forms the inductance of a series resonant circuit, and the presence of one or more sheets within its magnetic field directly affects its inductive reactance, and tunes the circuit towards resonance. As the resonant circuit is thus tuned, the voltage across the detecting head rises sharply and is utilized as a signal voltage in a simple control circuit to stop the feeding of sheets whenever a double thickness is fed. Within certain limits, which preferably are utilized in this invention, the inductance of the head and thus the voltage across it varies directly with the thickness of magnetic material held against its face. The double detector can therefore also be used as a gauge to determine the thickness of non-uniform sheets.

An object of the invention is the provision of a double detector having a small, compact, detecting head which may be disposed conveniently anywhere in the path of travel of the sheets without hindering maintenance of the machine upon which it is mounted.

Another object of the invention is the provision of a double detector or thickness gauge wherein the sheet material is used to vary the inductance of a series resonant circuit by acting as a shunt to affect the open magnetic circuit of an electromagnetic detecting head.

Still another object is to provide an inexpensive double detector which utilizes an electromagnetic detecting head and a simple electronic control circuit to stop the feeding of sheets whenever a double sheet or a sheet of abnormal thickness is detected.

A still further object is the provision of a double detector or thickness gauge wherein the magnetic attraction exerted by an electromagnetic detecting head is utilized to maintain the magnetic sheets in contact with the head.

Numerous other objects and advantages of the invention will be apparent as it is better understood from the following description, which, taken in connection with the accompanying drawings, discloses a preferred embodiment thereof.

Referring to the drawings:

Figure 1 is a perspective view of an embodiment of the instant invention showing the detecting head in position in the feed table of a sheet feeding machine; and Fig. 2 is a view showing a wiring diagram of an exemplary embodiment of the instant invention, the view also including a cross-section taken through the electromagnetic detecting head, with parts broken away.

As an exemplary or preferred embodiment of the present invention, the figures disclose an apparatus wherein magnetic sheets A are conveyed along a feed table 10 by a continuously running conveyor consisting of a pair of endless chains 11, the rear edges of the sheets being engaged by pairs of feed fingers 12 mounted on the chains 11. The feed table 10 may be the feed-in portion of any type of sheet metal printing, fabricating or treating machine, and the conveyor may, if desired, consist of a pair of reciprocating feed bars or other suitable and well known feeding devices.

The endless chains 11 are disposed in slots 13 formed in the feed table 10 in order that the sheets A may rest upon and be supported by the table. The chains 11 operate around a pair of driving sprockets 16, 17 which are mounted on a shaft 18 and are driven from a motor 20 by means of a pair of sprockets 21 and 22 and a drive chain 23. At the other end of the feed table, the chains operate around a pair of idler sprockets (not shown).

The sheets A are placed upon the feed table 10 in any suitable manner, the usual means being a high speed automatic device such as the one illustrated in United States Patent 2,156,648 issued on May 2, 1939 to L. Baker et al., and entitled Sheet Feeder. The sheets are usually fed singly, but at times two sheets stick together and are fed along the table in superposed relationship and form a so-called "double sheet." Fig. 1 shows both a single sheet and a double sheet on the feed table 10.

As the sheets A are advanced along the table 10, they pass over an electromagnetic detecting head 25 disposed in the table. The detecting head 25 preferably consists of an electromagnet of the iron-clad type and includes a coil 27 of a suitable number of turns of insulated wire mounted in a unitary steel frame 28 consisting of a core 29 and cylindrical shell 30 having one end open and one end closed.

A face or cover plate 31 formed of a nonmagnetic material such as bronze or stainless steel is secured to the core 29 by a screw 32 and serves as a protective cover to seal off the interior of the electromagnet against dirt, moisture, etc. and to prevent wearing away of the magnet frame 28 due to frictional contact with the sheets.

The detecting head 25 is disposed in an opening 35 formed in the feed table 10 and is preferably formed with an integral mounting flange 36 through which bolts 37 pass to secure the head to the table 10.

The lead wires 40, 41 of the coil 27 pass through an opening 42 formed in the closed end of the shell 30 and are connected across a source of fixed frequency, constant-potential alternating current indicated by the generator 43 and supply wires 44 and 45. A suitable condenser 46 is placed in the wire 41 and co-operates with the coil 27 to form a series resonant circuit.

The head 25 is preferably mounted in the table 10 with its face plate 31 substantially flush with the surface of the table. When the detector is operating, the coil 27 is constantly energized, and the upper portions of the core 29 and the shell 30 form magnet poles having an open magnetic circuit, the major portion of the external field of which extends above the surface of the table 10. As the sheets A are conveyed along the table, they pass over the detecting head 25 and are magnetically attracted by it and pulled into intimate contact with the face plate 31. Because of this magnetic attraction between the sheets A and the detecting head 25, it is unnecessary to provide mechanical hold down means to press the sheets against the face plate 31. The presence of a single or double sheet within the magnetic field of the electromagnet affects the inductance of the coil 27 and tunes the resonant circuit towards resonance. Since all of the sheets are held in contact with the face plate 31 the spacing or gap between the sheets and the magnet poles is a constant, and the only variable factor affecting the inductance of the coil 27 is the amount of magnetic material in the field.

The coil 27 and the condenser 46 are preferably so selected that the greatest possible variations in the voltages produced across the coil 27 by single or superposed sheets during the normal operation of the machine all fall within the straight line portion of the resonance curve of the circuit as it approaches resonance. Thus the voltage increment across the coil 27 can be made substantially proportional to the number of sheets fed at one time to thus give an accurate indication of the number of sheets in the magnetic field of the detecting head 25. The voltage across the coil 27 is utilized in the present embodiment of the invention as a signal voltage to stop the conveyor motor 20 in the event a multiple sheet is fed over the detector head 25.

This is done by having the signal voltage control the firing of a grid controlled rectifier tube 50 in such a manner that the tube fires constantly as long as normal sheets are fed and is cut off whenever a multiple sheet or an abnormally thick sheet is detected. Each time the tube 50 is cut off a circuit which controls the motor 20 is opened and the conveyor is stopped.

The rectifier tube 50 includes a cathode 51, a control grid 52, a shield grid 53 and an anode or plate 54 (see Fig. 2). The cathode 51 and the shield grid 53 are tied to the power supply lead 45 through a wire 55, while the plate 54 is connected to the coil of a relay 56 having two sets of contacts.

By referring to the wiring diagram of Fig. 2, it can be seen that the coil voltage is rectified by a selenium rectifier 57 charging condenser 58 to produce a negative bias voltage on the control grid 52 of the rectifier tube 50.

A balancing voltage which opposes the grid bias voltage is also impressed upon the control grid 52 and is obtained directly from the A. C. power line 45 through a potentiometer 62, having a movable arm 63, and through a suitable resistor 64.

Since the balancing voltage is positive whenever the plate voltage of the tube 50 is positive, the tube will conduct as long as this balancing voltage exceeds the negative grid bias voltage. This condition obtains as long as normal single sheets are being fed and current thus flows through the tube 50 and the relay 56 and through a holding circuit including a first relay contact arm 70 and a wire 71. As long as the relay is energized, a circuit 72 which controls the motor 20 is kept closed by a second relay contact arm 73, thus permitting the conveyor to operate.

Each time a double sheet or an abnormally thick sheet is passed over the detector head 25, the inductance of the coil 27 is increased and the resonant circuit is tuned towards resonance, with the result that the grid bias voltage greatly increases and exceeds the balancing voltage. When this condition occurs, the tube 50 ceases firing and the relay 56 cuts out and the relay contact arms 70 and 73 move to the position shown in dotted lines in Fig. 2.

In this position, the arm 70 closes a circuit including the wire 71 and a wire 76 with the result that pilot bulb 77 lights up, while the arm 73 breaks the motor control circuit 72, thus stopping the conveyor. In order to reset the detector and restart the motor 20 after the double sheet has been removed, a reset button 78 is provided to permit the relay 56 to pick up.

The exact point at which the tube 50 cuts off or ceases firing is determined by the setting of the potentiometer arm 63 which adjusts the balancing voltage. To obtain the proper setting to detect double sheets, the operator first places a single sheet in contact with the detector head and adjusts the potentiometer arm until the tube 50 cuts out, as indicated by the lighting of the pilot bulb 77. The potentiometer reading is noted, and the operation is repeated with a double sheet. The potentiometer arm is then set midway between the two readings, at which point the conveyor will operate as long as single sheets are fed but will stop whenever a double sheet is encountered.

The apparatus can also be used to detect abnormally thick sheets or strip stock. This can easily be done by using a test piece which just exceeds the maximum allowable thickness to determine the potentiometer setting at which the tube 50 cuts out. With the potentiometer at this setting, stock which exceeds this predetermined thickness will be detected and the conveyor stopped to permit its removal.

It should be understood that the invention is not limited to the exact construction illustrated in the drawings. Other types of electromagnets may be utilized with eminently satisfactory results. In addition, the face plate 31 may be omitted or set into the magnet frame 28, in which case the magnet frame would be mounted flush with the surface of the feed table 10 and the magnet poles would make direct contact with the sheets.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A thickness indicator for magnetic stock, comprising a support, means for feeding said stock onto said support, an electric sensitive resonant circuit including an open-ended electromagnet rigidly mounted in said support for creating a magnetic field extending outwardly from said support to draw said stock into intimate contact with said support adjacent the open end of said magnet, means adjacent the open end of said magnet for creating a constant predetermined gap between said stock and said magnet, said magnet also forming the inductor of said sensitive resonant circuit to tune said circuit towards resonance by said magnetic stock when the latter is present on said support adjacent said magnet, and means associated with said resonant circuit and operable in response to changes in said circuit to indicate stock of abnormal thickness passing through said magnetic field.

References Cited in the file of this patent

UNITED STATES PATENTS

| Number | Name | Date |
| --- | --- | --- |
| 1,792,249 | Serduke | Feb. 10, 1931 |
| 1,969,536 | Winne | Aug. 7, 1934 |
| 1,983,388 | Moore | Dec. 4, 1934 |
| 2,203,508 | Rosenthal | June 4, 1940 |
| 2,223,463 | Rosenthal | Dec. 3, 1940 |
| 2,349,992 | Schrader | May 30, 1944 |
| 2,481,345 | Reynst | Sept. 6, 1949 |
| 2,503,812 | Fath | Apr. 11, 1950 |
| 2,554,575 | Kurtz et al. | May 29, 1951 |
| 2,572,908 | Bernholt | Oct. 30, 1951 |
| 2,579,922 | Goldsworthy | Dec. 25, 1951 |
| 2,587,631 | Kuehne | Mar. 4, 1952 |